US012124187B2

(12) United States Patent
Okamoto et al.

(10) Patent No.: US 12,124,187 B2
(45) Date of Patent: Oct. 22, 2024

(54) IMAGE FORMING APPARATUS CAPABLE OF EXECUTING SPEED REDUCTION CONTROL OF SYSTEM LINEAR SPEED AT TIME OF WARMING-UP

(71) Applicant: KYOCERA Document Solutions Inc., Osaka (JP)

(72) Inventors: Sueaki Okamoto, Osaka (JP); Masahito Ishino, Osaka (JP); Takahisa Nakaue, Osaka (JP); Tomohiro Tamaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/350,616

(22) Filed: Jul. 11, 2023

(65) Prior Publication Data

US 2024/0027936 A1 Jan. 25, 2024

(30) Foreign Application Priority Data

Jul. 20, 2022 (JP) ................................ 2022-115654

(51) Int. Cl.
*G03G 15/00* (2006.01)
*G03G 15/08* (2006.01)
(Continued)

(52) U.S. Cl.
CPC ..... *G03G 15/0865* (2013.01); *G03G 15/2092* (2013.01); *G03G 15/5008* (2013.01);
(Continued)

(58) Field of Classification Search
CPC ........... G03G 15/0812; G03G 15/0865; G03G 15/2092; G03G 15/5008; G03G 21/0011;
(Continued)

(56) References Cited

U.S. PATENT DOCUMENTS

2002/0021561 A1 2/2002 Yamauchi et al. ............ 361/760
2010/0247120 A1* 9/2010 Murata ................ G03G 21/203 399/53

FOREIGN PATENT DOCUMENTS

JP 2002-025857 A 1/2002
JP 2010072189 A * 4/2010

OTHER PUBLICATIONS

Translation of JP 2010-072189 A; Fujita et al., publication date of Apr. 2, 2010 (Year: 2010).*

* cited by examiner

*Primary Examiner* — Sophia S Chen
(74) *Attorney, Agent, or Firm* — Stein IP, LLC

(57) ABSTRACT

An image forming apparatus includes an image carrying member, a charging device, an exposure device, a developing device, and a control section. The developing device includes a development container for containing a non-magnetic one-component developer composed only of a toner, a developer carrying member having an outer circumferential surface on which a toner layer is formed, and a regulation blade that regulates a thickness of the toner layer. The control section executes speed reduction control to reduce a rotation speed of the developer carrying member at a time of warming-up before image formation to a first speed lower than a reference speed at a time of the image formation. In the speed reduction control, the control section raises the rotation speed of the developer carrying member at a first acceleration rate until the first speed is reached from a state where rotation of the developer carrying member is stopped.

10 Claims, 11 Drawing Sheets

(51) Int. Cl.
*G03G 15/20* (2006.01)
*G03G 21/00* (2006.01)
*G03G 21/02* (2006.01)

(52) U.S. Cl.
CPC ......... *G03G 21/0011* (2013.01); *G03G 21/02* (2013.01); *G03G 2215/00084* (2013.01); *G03G 2215/0402* (2013.01)

(58) Field of Classification Search
CPC ......... G03G 21/02; G03G 2215/00084; G03G 2215/0402
See application file for complete search history.

-Prior Art-

-Prior Art-

-Prior Art-

| | | | | | | | |
|---|---|---|---|---|---|---|---|
| INTERVAL | 0 | 0 | 5min | 10min | 20min | 20min | 20min |
| PRINTING MODE | CONTIN-NUOUS | INTER-MITTENT | INTER-MITTENT | INTER-MITTENT | INTER-MITTENT | INTER-MITTENT | INTER-MITTENT |
| AMBIENT TEMPERATURE | 23°C | 23°C | 23°C | 23°C | 23°C | 18°C | 10°C |

IMAGE FORMING APPARATUS CAPABLE OF EXECUTING SPEED REDUCTION CONTROL OF SYSTEM LINEAR SPEED AT TIME OF WARMING-UP

INCORPORATION BY REFERENCE

This application is based upon and claims the benefit of priority from the corresponding Japanese Patent Application No. 2022-115654, filed on Jul. 20, 2022, the entire contents of which are incorporated herein by reference.

BACKGROUND

The present disclosure relates to an image forming apparatus using an electrophotographic process, such as a copy machine, a printer, or a facsimile, and relates particularly to an image forming apparatus including a developing device of a non-magnetic one-component development type.

Known types of developing devices used in image forming apparatuses employing an electrophotographic method, such as a copy machine, a printer, a facsimile, and a multi-functional peripheral equipped with functions of these apparatuses, include a two-component development type using a toner and a carrier as a developer and a one-component development type using only a toner without using a carrier.

In a developing device of the non-magnetic one-component development type using a non-magnetic toner, a regulation blade as a developer regulation member is disposed so as to be in contact with a surface of a developing roller that is a developer carrying member. Further, the toner is conveyed by microscopic asperities provided on the surface of the developing roller and is regulated by the regulation blade so that any excess of the toner is removed, thus being formed into a thin toner layer. Furthermore, when the toner passes below the regulation blade, the surface of the developing roller and the toner become charged by friction therebetween. Further, a photosensitive member and the developing roller are rotated in contact with each other, and thus, under an electric field, the toner on the surface of the developing roller is developed on the photosensitive member.

The non-magnetic one-component development type described above presents a problem that a toner might melt due to frictional heat generated between the regulation blade and the rotating developing roller, resulting in sticking (melt adhesion) of the molten toner to the regulation blade. Such toner sticking to the regulation blade may lead to a case where a toner that has already stuck grows to a size of several tens to several hundreds of μm as a result of further toner sticking thereto, thus interfering with formation of a toner layer on the developing roller to cause occurrence of white streaks in an image. In order to obtain high-quality images over a long time of use, it is extremely important to suppress toner sticking to the regulation blade.

To this end, there has been used a toner in which particulates of silica or the like are added as an external additive to surfaces of toner base particles formed of a polyester or the like. The external additive serves to improve fluidity and chargeability of the toner and also to prevent the toner base particles, which are relatively soft and thus are likely to be deformed, from directly coming in contact with a surface of the regulation blade. This toner is used to suppress toner sticking to the regulation blade as described above. In a case, however, where the toner repeatedly passes below the regulation blade due to endurance printing, the external additive might be embedded into the toner base particles or detached from the toner base particles, thus bringing the toner base particles to an exposed state (for the sake of convenience, this phenomenon is referred to as toner deterioration). As a result, toner sticking to the regulation blade becomes likely to occur. Accordingly, toner sticking to the regulation blade is likely to occur in a latter half of a life (a service life) of the developing device.

SUMMARY

An image forming apparatus according to an aspect of the present disclosure includes an image carrying member, a charging device, an exposure device, a developing device, and a control section. The image carrying member includes a photosensitive layer formed on a surface thereof. The charging device charges the image carrying member to a prescribed surface potential. The exposure device exposes to light the surface of the image carrying member charged by the charging device so as to form thereon an electrostatic latent image with attenuated electrostatic charge. The developing device includes a development container for containing a non-magnetic one-component developer composed only of a toner, a developer carrying member that is brought into pressure contact at a prescribed pressing force with the image carrying member and has an outer circumferential surface on which the toner is carried to form a toner layer, and a regulation blade that contacts the outer circumferential surface of the developer carrying member so as to regulate a thickness of the toner layer formed on the outer circumferential surface of the developer carrying member. The developing device supplies the toner to the image carrying member on which the electrostatic latent image is formed. The control section controls driving of the developing device. The control section executes speed reduction control to reduce a rotation speed of the developer carrying member at a time of warming-up before image formation to a first speed lower than a reference speed at a time of the image formation. In the speed reduction control, the control section raises the rotation speed of the developer carrying member at a first acceleration rate until the first speed is reached from a state where rotation of the developer carrying member is stopped.

DETAILED DESCRIPTION (1. Overall Configuration of Image Forming Apparatus 1)

Figure 1:
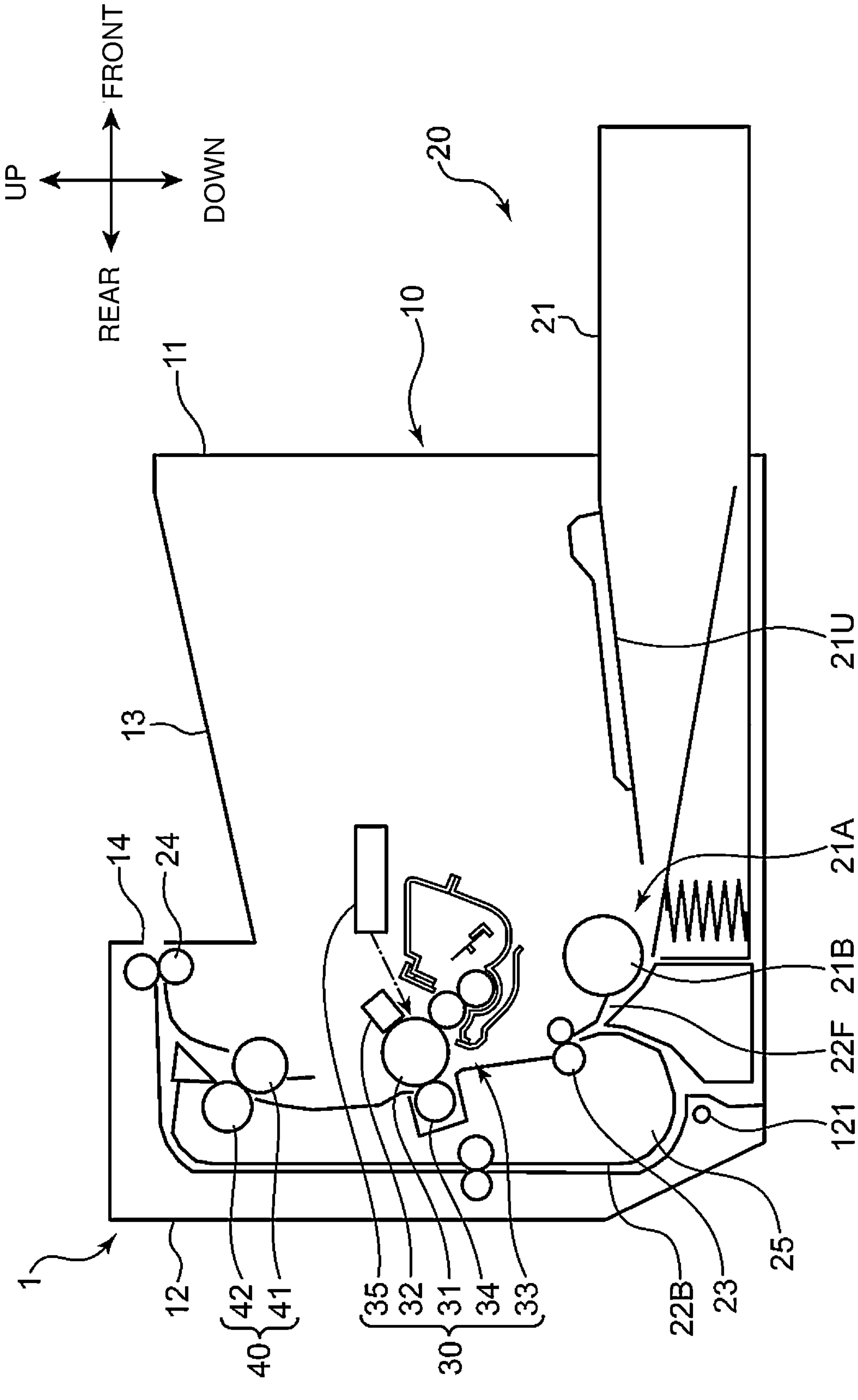
FIG. 1 is a sectional side view showing a schematic configuration of an image forming apparatus according to an embodiment of the present disclosure.

With reference to the appended drawings, the following describes an embodiment of the present disclosure. FIG. 1 is a sectional side view showing a schematic configuration of an image forming apparatus 1 according to an embodiment of the present disclosure. In FIG. 1, a right side corresponds to a front side of the image forming apparatus 1, and a left side corresponds to a rear side thereof.

The image forming apparatus 1 (herein, a monochrome printer) includes, in addition to a main body housing 10 having a housing structure substantially in a rectangular parallelepiped shape, a paper feed section 20, an image forming section 30, and a fixing portion 40, which are housed in the main body housing 10. The main body housing 10 includes a front cover 11 provided on a front surface side thereof and a rear cover 12 provided on a rear surface side thereof. When the rear cover 12 is opened, respective units of the image forming section 30 and the fixing portion 40 can be inserted in or taken out of the main body housing 10 from the rear surface side thereof. Furthermore, on an upper surface of the main body housing 10, there is provided a paper discharge portion 13 to which a sheet after being subjected to image formation is discharged. In the following description, a term "sheet" refers to a copy sheet, a sheet of coated paper, an OHP sheet, a sheet of cardboard, a postcard, a sheet of tracing paper, or any other sheet material to be subjected to image forming processing.

The paper feed section 20 includes a paper feed cassette 21 for housing sheets to be subjected to image forming processing. The paper feed cassette 21 has a part protruding further forward from a front surface of the main body housing 10. An upper surface of a part of the paper feed cassette 21 housed in the main body housing 10 is covered with a paper feed cassette top plate 21U. The paper feed cassette 21 is provided with a sheet housing space for housing a bundle of sheets, a lift plate with which the bundle of sheets is lifted so as to be fed, and so on. A sheet feed-out portion 21A is provided above a rear end side of the paper feed cassette 21. In the sheet feed-out portion 21A, there is disposed a paper feed roller 21B for feeding out a topmost sheet one by one from the bundle of sheets in the paper feed cassette 21.

The image forming section 30 performs an image forming operation in which a toner image (a developer image) is formed on a sheet sent out from the paper feed section 20. The image forming section 30 includes, in addition to a photosensitive drum 31, a charging portion 32, an exposure portion 35, a developing portion 33, and a transfer roller 34, which are disposed around the photosensitive drum 31.

The photosensitive drum 31 (an image carrying member) includes a rotary shaft and an outer circumferential surface (a drum main body) that rotates about the rotary shaft. The photosensitive drum 31 is formed of, for example, a known organic photoconductor (OPC), and a photosensitive layer composed of an electric charge generation layer, an electric charge transport layer, and so on is formed on the outer circumferential surface thereof. After the photosensitive layer is uniformly charged by the after-mentioned charging portion 32, light is applied thereto by the exposure portion 35 so that an electrostatic latent image with attenuated electrostatic charge is formed thereon, and by the developing portion 33, the electrostatic latent image is visualized into a toner image, which is thus carried on the photosensitive layer.

Figure 2:
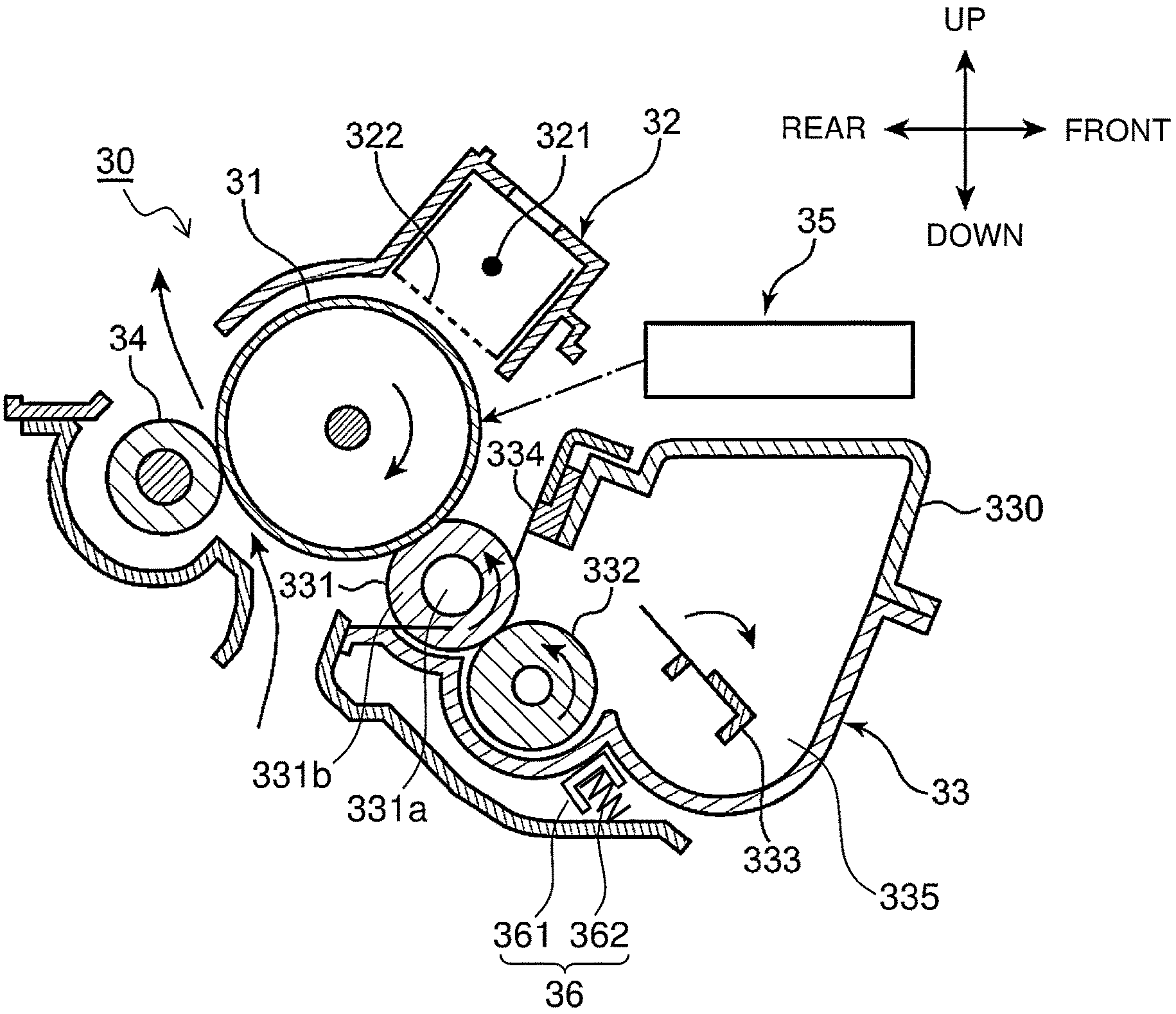
FIG. 2 is a sectional side view showing a schematic configuration of an image forming section of the image forming apparatus of the present embodiment.

The charging portion 32 (a charging device) is disposed at a prescribed distance from the outer circumferential surface of the photosensitive drum 31 and uniformly charges the outer circumferential surface of the photosensitive drum 31 without contacting it. Specifically, the charging portion 32 includes a charge wire 321 and a grid electrode 322 (both are shown in FIG. 2). The charge wire 321 is a linear electrode extending in a rotation axis direction of the photosensitive drum 31 and generates corona discharge between itself and the photosensitive drum 31. The grid electrode 322 is a grid-shaped electrode extending in the rotation axis direction of the photosensitive drum 31 and is placed between the charge wire 321 and the photosensitive drum 31. In the charging portion 32, a current having a prescribed current value is passed through the charge wire 321 so that corona discharge is generated, and a prescribed voltage is applied to the grid electrode 322, and thus the outer circumferential surface of the photosensitive drum 31 opposed to the grid electrode 322 is uniformly charged to a prescribed surface potential.

The exposure portion 35 (an exposure device) includes a laser light source and optical system instruments such as a mirror and a lens and applies, to the outer circumferential surface of the photosensitive drum 31, light modulated based on image data provided from an external apparatus such as a personal computer. With this configuration, the exposure portion 35 forms, on the outer circumferential surface of the photosensitive drum 31, an electrostatic latent image corresponding to an image based on the image data.

The developing portion 33 (a developing device) is demountably mounted in the main body housing 10 and supplies a toner (a non-magnetic one-component developer) to the outer circumferential surface of the photosensitive drum 31 so as to develop an electrostatic latent image formed on the outer circumferential surface of the photosensitive drum 31. To develop an electrostatic latent image means to visualize the electrostatic latent image into a toner image (a developer image). A detailed configuration of the developing portion 33 will be described later.

The transfer roller 34 is a roller for transferring, onto a sheet, a toner image formed on the outer circumferential surface of the photosensitive drum 31. Specifically, the transfer roller 34 has an outer circumferential surface that axially rotates and is opposed to the outer circumferential surface of the photosensitive drum 31 at a position on a downstream side relative to a developing roller 331 in a rotation direction of the photosensitive drum 31. The transfer roller 34 transfers the toner image carried on the outer circumferential surface of the photosensitive drum 31 to a sheet passing through a nip between itself and the outer circumferential surface of the photosensitive drum 31. During this transfer, a transfer voltage having a polarity opposite to that of the toner is applied to the transfer roller 34.

The fixing portion 40 performs fixing processing in which a toner image transferred to a sheet is fixed on the sheet. The fixing portion 40 includes a fixing roller 41 and a pressing roller 42. The fixing roller 41 includes therein a heating source and heats the toner transferred to the sheet at a prescribed temperature. The pressing roller 42 is brought into pressure contact with the fixing roller 41, thus forming a fixing nip between itself and the fixing roller 41. When the sheet to which the toner image has been transferred is passed through the fixing nip, the toner image is fixed on the sheet under heat applied by the fixing roller 41 and a pressure applied by the pressing roller 42.

In the main body housing 10, there are provided a main conveyance path 22F and an inversion conveyance path 22B, which are used for sheet conveyance. The main conveyance path 22F extends from the sheet feed-out portion 21A in the paper feed section 20 to a paper discharge port 14 provided to be opposed to the paper discharge portion 13 on the upper surface of the main body housing 10 via the image forming section 30 and the fixing portion 40. The inversion conveyance path 22B is a conveyance path used in duplex printing on a sheet, along which the sheet with one side thereof having been subjected to printing is conveyed back to an upstream side of the image forming section 30 in the main conveyance path 22F.

The main conveyance path 22F is provided to extend so as to pass upward from below through a transfer nip formed by the photosensitive drum 31 and the transfer roller 34. Furthermore, a registration roller pair 23 is disposed on an upstream side relative to the transfer nip in the main conveyance path 22F. At the registration roller pair 23, conveyance of a sheet is once stopped so that the sheet is subjected to skew correction, and then the sheet is sent out to the transfer nip at a prescribed timing for image transfer. At suitable locations in the main conveyance path 22F and the inversion conveyance path 22B, there is disposed a plurality of conveyance rollers used for sheet conveyance. A paper discharge roller pair 24 is disposed in a neighborhood of the paper discharge port 14.

The inversion conveyance path 22B is formed between an outside surface of an inversion unit 25 and an inner surface of the rear cover 12 of the main body housing 10. The transfer roller 34 and one of rollers constituting the regulation roller pair 23 are mounted on an inside surface of the inversion unit 25. The rear cover 12 and the inversion unit 25 are each axially pivotable about a supporting point 121 provided at a lower end thereof. Upon occurrence of a jam (a paper jam) in the inversion conveyance path 22B, the rear cover 12 is opened. Upon occurrence of a jam in the main conveyance path 22F or in a case where a unit of the photosensitive drum 31 or the developing portion 33 is taken outside, not only the rear cover 12 but also the inversion unit 25 is opened.

(2. Configuration of Image Forming Section 30)

Figure 3:
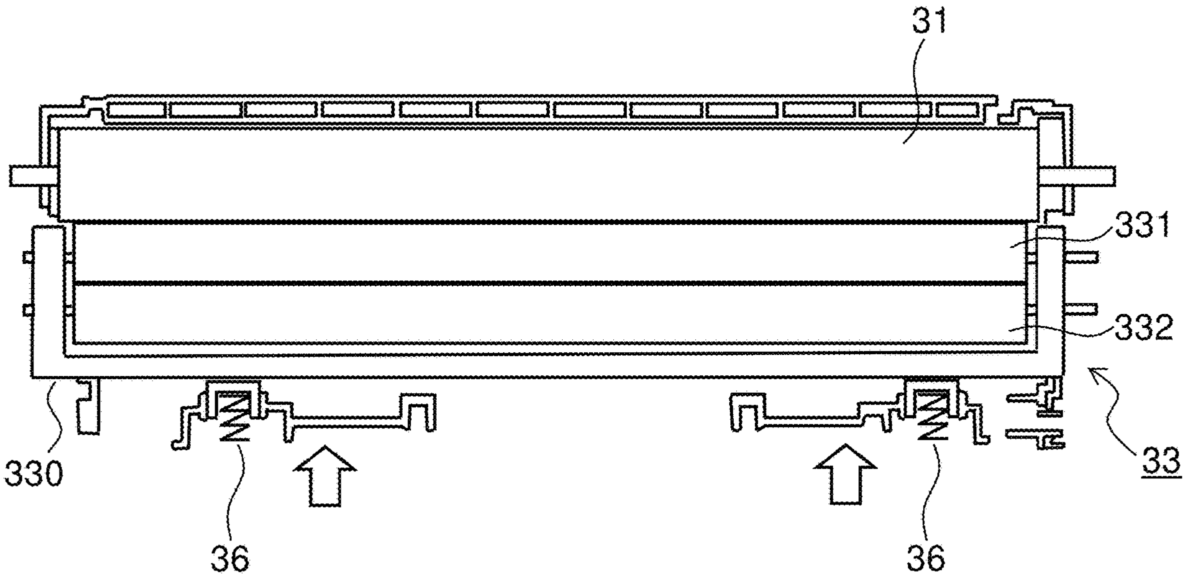
FIG. 3 is a plan view, as seen from above, of a vicinity of a contact part between a photosensitive drum and a developing roller of a developing portion.
Figure 4:
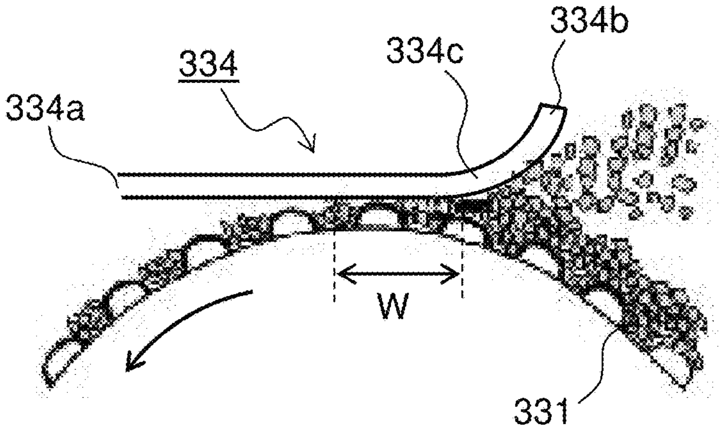
FIG. 4 is an enlarged sectional view of a vicinity of a contact part between the developing roller and a regulation blade in the developing portion.

FIG. 2 is a sectional view of the image forming section 30 in the image forming apparatus 1 of the present embodiment. FIG. 3 is a plan view, as seen from above, of a vicinity of a contact part between the photosensitive drum 31 and the developing roller 331 of the developing portion 33. FIG. 4 is an enlarged sectional view of a vicinity of a contact part between the developing roller 331 and a regulation blade 334 in the developing portion 33.

As shown in FIG. 2 and FIG. 3, the developing portion 33 includes a development housing 330 (a development container), the developing roller 331 (a developer carrying member), a supply roller 332, an agitation paddle 333, and the regulation blade 334.

The development housing 330 contains therein a non-magnetic one-component developer composed only of a toner and houses the developing roller 331, the supply roller 332, the regulation blade 334, and so on. The development housing 330 includes an agitation chamber 335 for containing the developer (the toner) in an agitated state. The agitation paddle 333 is disposed in the agitation chamber 335. The agitation paddle 333 is used to agitate the toner in the agitation chamber 335.

The developing roller 331 includes a rotary shaft 331*a* and a roller portion 331*b*. The rotary shaft 331*a* is rotatably supported to bearings (not shown) provided in the development housing 330. The roller portion 331*b* is a cylindrical member stacked on an outer circumferential surface of the rotary shaft 331*a* and is configured by stacking, on a surface of a base rubber (for example, silicone rubber), a coat layer formed of an uneven coating material such as urethane. The roller portion 331*b* rotates integrally with the rotary shaft 331*a* as the rotary shaft 331*a* rotates. A toner layer (a developer layer) having a prescribed thickness is formed on a surface of the roller portion 331*b*. A thickness of the toner layer is regulated (uniformly adjusted to a prescribed thickness) by the after-mentioned regulation blade 334. The toner layer becomes charged with static electricity generated upon abutting of the toner layer on the regulation blade 334.

At a position opposed to the photosensitive drum 31, the developing roller 331 rotates in a direction (a counterclockwise direction in FIG. 2) directed from an upstream side to a downstream side in a rotation direction of the photosensitive drum 31 (a clockwise direction in FIG. 2). That is, at the position opposed to the photosensitive drum 31, the developing roller 331 rotates in the same direction as the rotation direction of the photosensitive drum 31.

The supply roller 332 is disposed to be opposed to the developing roller 331. The supply roller 332 holds, on an outer circumferential surface thereof, the developer contained in the agitation chamber 335. Furthermore, the supply roller 332 supplies the developer held on the outer circumferential surface thereof to the developing roller 331.

At a position opposed to the developing roller 331, the supply roller 332 rotates in a direction (the counterclockwise direction in FIG. 2) directed from a downstream side to an upstream side in the rotation direction of the developing roller 331 (the counterclockwise direction in FIG. 2). That is, at the position opposed to the developing roller 331, the supply roller 332 rotates in an opposite direction to the rotation direction of the developing roller 331. In order to cause the toner to move from the supply roller 332 to the developing roller 331, a prescribed supply voltage (a direct-current voltage) is applied to the supply roller 332.

The developing roller 331 is supplied with the developer from the supply roller 332 and holds the toner layer on an outer circumferential surface thereof. Further, the developing roller 331 supplies the developer to the photosensitive drum 31. The developing roller 331 and the supply roller 332 each have a length in an axial direction (a direction orthogonal to a drawing plane of FIG. 2) substantially equal to a length of the photosensitive drum 31 in the axial direction. In order to cause the toner to move from the developing roller 331 to the photosensitive drum 31, a prescribed development voltage (a direct-current voltage) is applied to the developing roller 331.

In the image forming section 30, a pressing mechanism 36 composed of a pressing member 361 and a pressing spring 362 is disposed on an opposite side to the photosensitive drum 31 via the development housing 330 (a lower right side in FIG. 2, a lower side in FIG. 3). The pressing mechanism 36 is disposed at each of two locations on the development housing 330 along a longitudinal direction thereof (at positions 85 mm away from a center of the photosensitive drum 31 in the axial direction). When the developing portion 33 is attached to the image forming section 30, the development housing 330 is brought into pressure contact with the pressing member 361 and thus is pressed in a direction toward the photosensitive drum 31 (an upper left direction in FIG. 2, an upper direction in FIG. 3), so that the developing roller 331 is pressed at a prescribed pressing force to the photosensitive drum 31. The developing portion 33 and the photosensitive drum 31 have no mechanism for regulating a distance between the developing roller 331 and the photosensitive drum 31, namely, no mechanism for regulating a pressing force of the developing roller 331 with respect to the photosensitive drum 31.

The regulation blade 334 is a thin plate-shaped member made of metal. The regulation blade 334 is configured so that a proximal end 334*a* thereof is secured to the development housing 330 and a distal end 334*b* thereof is a free end. At a position on an upstream side relative to a position at which the photosensitive drum 31 is opposed to the developing roller 331 in the rotation direction of the developing roller 331, the regulation blade 334 contacts the outer circumferential surface of the developing roller 331.

The regulation blade 334 is flexibly deformable, and there is a contact part (a nip) between the reregulate blade 334 and the developing roller 331 in a circumferential direction of the developing roller 331. The regulation blade 334 abuts on the outer circumferential surface of the developing roller 331 (the roller portion 331*b*) at a prescribed regulation pressure and with a prescribed nip width W.

The regulation blade 334 is made of, for example, stainless steel (SUS304) and has a free length of 10 mm in the present embodiment. The distal end 334*b* of the regulation blade 334 is bent so that a curved part 334*c* is formed. The curved part 334*c* abuts on the outer circumferential surface of the developing roller 331. The curved part 334*c* has a radius of curvature of not less than 0.1 mm.

As shown in FIG. 4, the regulation blade 334 abuts on the developing roller 331 at a prescribed regulation pressure (contact linear pressure), and thus the toner layer carried on the outer circumferential surface of the developing roller 331 is adjusted to be uniform in thickness. With this configuration, the regulation blade 334 regulates an amount of the toner on the outer circumferential surface of the developing roller 331. Furthermore, the regulation blade 334 rubs on the toner carried on the outer circumferential surface of the developing roller 331 and thus charges the toner. The contact linear pressure of the regulation blade 334 with respect to the developing roller 331 refers to a contact pressure per unit length of the regulation blade 334 at a contact position between the regulation blade 334 and the outer circumferential surface of the developing roller 331.

(3. Control Paths of Image Forming Apparatus 1)

Figure 5:
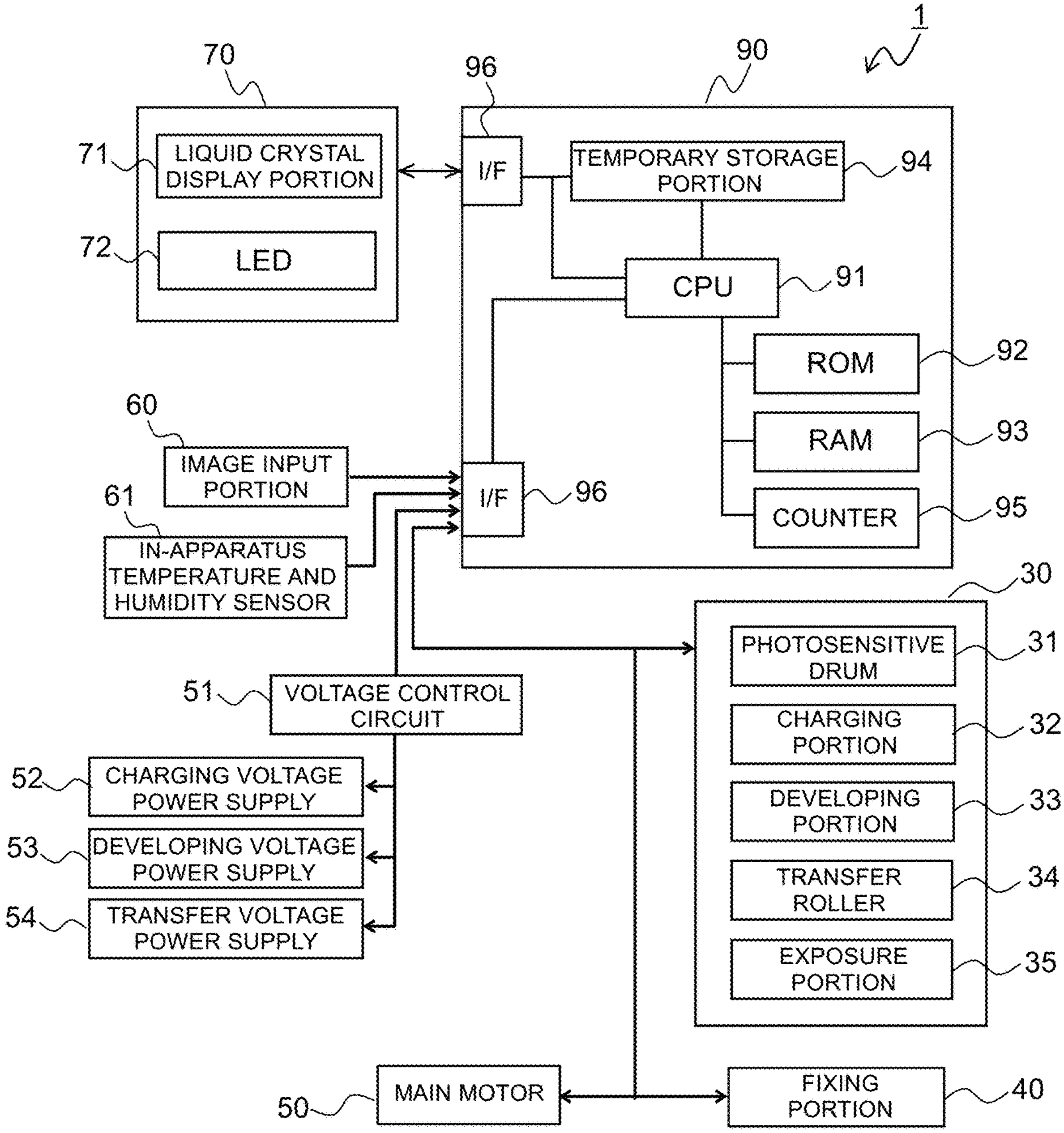
FIG. 5 is a block diagram showing an example of control paths used in the image forming apparatus of the present embodiment.

FIG. 5 is a block diagram showing an example of control paths used in the image forming apparatus 1 of the present embodiment. In using the image forming apparatus 1, the various portions therein are controlled in different ways, and thus the image forming apparatus 1 as a whole has complicated control paths. Thus, herein, a description of the control paths is made with emphasis on some of the control paths required for implementing the present disclosure.

Based on output signals from a control section 90, a main motor 50 drives to rotate, in addition to the paper feed roller 21B and the photosensitive drum 31, the developing roller 331, the supply roller 332, and the agitation paddle 333 in the developing portion 33, the fixing roller 41 in the fixing portion 40, and so on at prescribed respective rotation speeds.

A voltage control circuit 51 is connected to a charging voltage power supply 52, a development voltage power supply 53, and a transfer voltage power supply 54 and, based on output signals from the control section 90, operates these power supplies. Based on a control signal from the voltage control circuit 51, the charging voltage power supply 52 applies a charging voltage to the charge wire 321 in the charging portion 32. The development voltage power supply 53 applies a development voltage to the developing roller 331 in the developing portion 33 and a supply voltage to the supply roller 332 in the developing portion 33. The transfer voltage power supply 54 applies a transfer voltage to the transfer roller 34.

An image input portion 60 is a reception portion that receives image data transmitted from a personal computer or the like to the image forming apparatus 1. An image signal inputted from the image input portion 60 is converted into a digital signal, which then is sent out to a temporary storage portion 94.

An in-apparatus temperature and humidity sensor 61 detects a temperature and a humidity inside the image forming apparatus 1, particularly a temperature and a humidity in a vicinity of the developing portion 33, and is disposed in a neighborhood of the image forming section 30.

An operation section 70 is provided with a liquid crystal display portion 71 and an LED 72 that indicates various states and thus functions to indicate a status of the image forming apparatus 1 and to display an image forming situation and the number of printed copies. Various settings for the mage forming apparatus 1 are made via a printer driver of a personal computer.

The control section 90 includes at least a CPU (central processing unit) 91 as a central computation processor, a ROM (read-only memory) 92 that is a read-only storage portion, a RAM (random-access memory) 93 that is a readable and writable storage portion, the temporary storage portion 94 that temporarily stores image data and so on, a counter 95, and a plurality of (herein, two) I/Fs (interfaces) 96 that transmits control signals to the various devices in the image forming apparatus 1 and receives input signals from the operation section 70.

The ROM 92 contains, for example, data not to be changed during use of the image forming apparatus 1, such as control programs for the image forming apparatus 1 and numerical values required for control. The RAM 93 stores, for example, data necessitated when control of the image forming apparatus 1 is in progress and data temporarily required for controlling the image forming apparatus 1.

The temporary storage portion 94 temporarily stores an image signal inputted from the image input portion 60, which receives image data transmitted from a personal computer or the like, and converted into a digital signal. The counter 95 cumulatively counts the number of printed sheets.

Furthermore, the control section 90 transmits control signals from the CPU 91 to the various portions and devices in the image forming apparatus 1 via the I/Fs 96. Furthermore, from the various portions and devices, signals indicating respective statuses thereof and input signals are transmitted to the CPU 91 via the I/Fs 96. Examples of the various portions and devices controlled by the control section 90 include the image forming section 30, the fixing portion 40, the main motor 50, the voltage control circuit 51, the image input portion 60, and the operation section 70.

(4. Speed Reduction Control of System Linear Speed at Time of Not Performing Image Formation)

The following describes speed reduction control of a system linear speed at a time of not performing image formation (a time of not performing development), which characterizes the image forming apparatus 1 of the present embodiment. As described earlier, occurrence of white streaks in an image is closely related to a rotation speed of the developing roller 331. Specifically, an increase in the rotation speed of the developing roller 331 leads to an increase in friction that occurs between the regulation blade 334 and the developing roller 331, and thus toner deterioration and toner sticking to the regulation blade 334 attributable thereto become likely to occur, causing occurrence of white streaks in an image.

Furthermore, a degree of toner sticking to the regulation blade 334 varies depending on printing conditions. Specifically, the degree varies depending on whether continuous printing or intermittent printing is performed and also depending on an interval (a printing interval) of the intermittent printing. Moreover, the degree varies also depending on a surrounding temperature (an ambient temperature) of the image forming apparatus 1.

From this viewpoint, in the image forming apparatus 1 of the present embodiment, the speed reduction control of the system linear speed (the rotation speed of the developing roller 331) at the time of not performing image formation is performed in accordance with printing conditions so that toner sticking to the regulation blade 334 is suppressed while a printing wait time is maximally reduced. The following describes in detail the speed reduction control of the system linear speed.

First, an endurance printing test was conducted under varying printing conditions (continuous printing or intermittent printing, an interval of the intermittent printing, and the ambient temperature) to study an effect of prolonging a life of the developing portion 33 (a period of time from a start of use of the developing portion 33 to when the toner in the development housing 330 ran out or a period of time up to when characters in an output image broke due to increased occurrence of white streaks in the image, whichever was completed first) provided by the speed reduction control of the system linear speed. The image forming apparatus 1 (manufactured by KYOCERA Document Solutions Inc.) shown in FIG. 1 was used as a test apparatus.

As the developing roller 331, there was used a roller including the roller portion 331*b* and the rotary shaft 331*a* and having an Asker C hardness of 55°. The roller portion 331*b* included, as a base material layer, a silicone rubber layer having a thickness of 3.5 mm and coated with a urethane coating and had an outer diameter of 13 mm, a length of 232 mm in the axial direction, and a resistance value of 7.1 [log Ω]. The rotary shaft 331*a* had a shaft diameter of 6 mm. A linear speed of the developing roller 331 was set to 195 mm/sec. A constant pressure load instrument (CL-150 manufactured by Kobunshi Keiki Co., Ltd.) was used to measure an Asker C hardness. For measurement of a resistance value, the developing roller 331 was rotated in contact with a metal roller, and a direct-current voltage of 100 V was applied thereto.

As the photosensitive drum 31, there was used a positively-charged single-layer OPC photosensitive drum (manufactured by KYOCERA Document Solutions Inc.) having an outer diameter of 24 mm and a photosensitive layer thickness of 22 μm.

In a test method adopted, an image of standard data stipulated in ISO/IEC 19752 (a character pattern with a printing rate of 3.9%) was outputted in an A4 size as a test image. For evaluation of toner sticking to the regulation blade 334, it was visually determined whether or not white streaks had occurred in the outputted test image. The life of the developing portion 33 was determined based on a cumulative number of printed sheets at a time when the toner in the developing portion 33 ran out or a time when characters in the outputted test image broke due to increased occurrence of white streaks in the image, whichever was reached first, and a target value of the cumulative number was set to 1,500 sheets.

Figure 6:
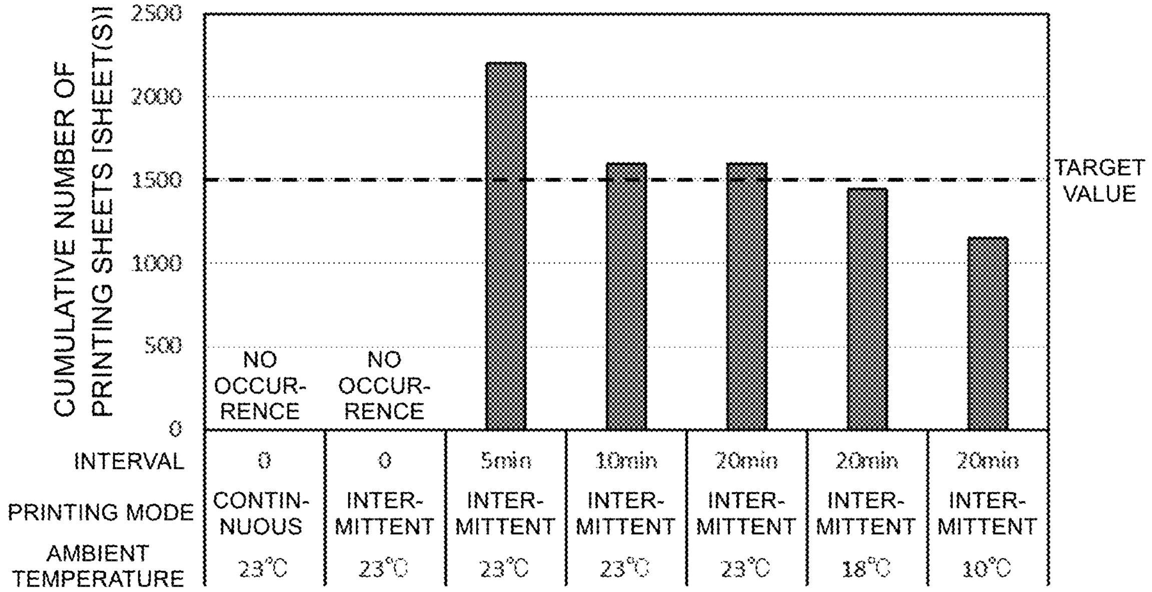
FIG. 6 is a graph showing results of an endurance printing test in a case of not performing speed reduction control of a system linear speed at a time of warming-up (a conventional example), with a system linear speed at a time of image formation set to 120 [mm/sec].
Figure 7:
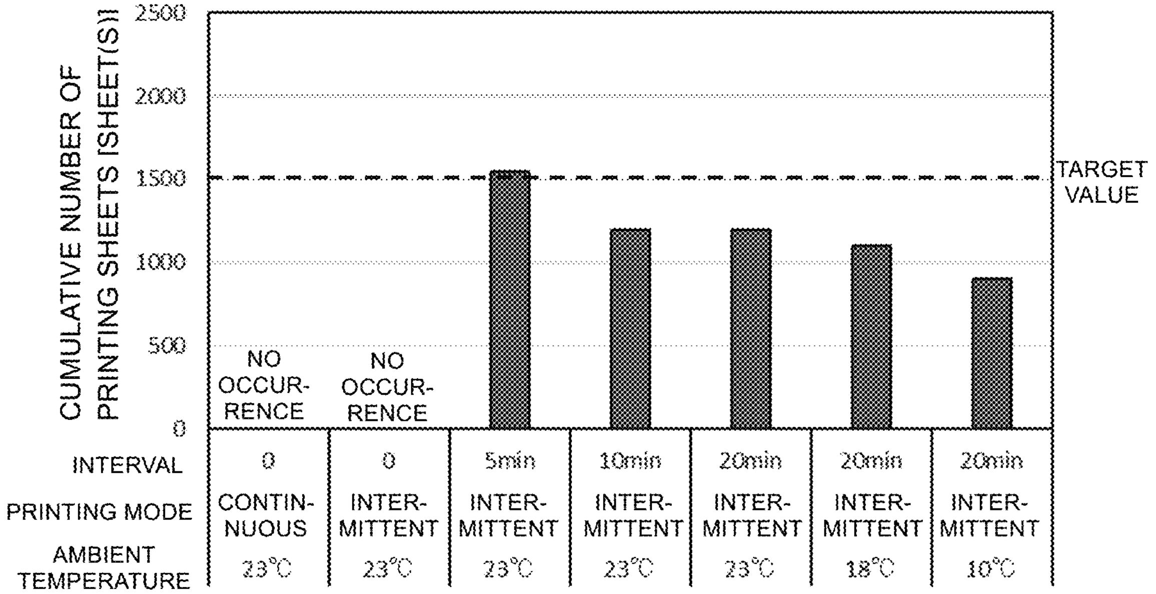
FIG. 7 is a graph showing results of the endurance printing test in the case of not performing the speed reduction control of the system linear speed at the time of warming-up (the conventional example), with the system linear speed at the time of image formation set to 200 [mm/sec].

FIG. 6 and FIG. 7 are graphs showing results of the endurance printing test in a case of not performing the speed reduction control of the system linear speed at a time of warming-up (at start-up before image formation). In FIG. 6 and FIG. 7, a system linear speed at a time of image formation (a reference speed) is set to 120 [mm/sec] and 200 [mm/sec], respectively.

As shown in FIG. 6, in a case where the system linear speed at the time of image formation was 120 [mm/sec], in continuous printing and in intermittent printing with an interval of 0 [mins], until the toner in the developing portion 33 ran out, there was no occurrence of white streaks in the image due to toner sticking. However, as the interval of the intermittent printing was increased to 5 [mins], 10 [mins], and 20 [mins], it became likely that white streaks occurred in the image due to toner sticking, and when an ambient temperature in an installment environment of the image forming apparatus 1 was decreased from 23° C. to 18° C.

and further to 10° C., it became more likely that white streaks occurred in the image. When the interval of the intermittent printing is not less than 20 [mins] and the ambient temperature is not more than 18° C., toner sticking occurs at a cumulative number of printed sheets less than its target value of 1,500 sheets as a target value of the life of the developing portion 33.

As shown in FIG. 7, in a case where the system linear speed at the time of image formation was 200 [mm/sec], while a tendency of occurrence of toner sticking was similar to that in the case where the system linear speed was 120 [mm/sec], with the increased linear speed, it became more likely that white streaks occurred in the image due to toner sticking. Specifically, when the interval of the intermittent printing was not less than 10 [mins], toner sticking occurred at a cumulative number of printed sheets less than 1,500 sheets, so that there were more conditions under which the target value of 1,500 sheets failed to be met. Even when the interval of the intermittent printing was increased from 10 [mins] to 20 [mins], there was not so much difference in the number of printed sheets in which toner sticking occurred, and thus it was found that an increased interval of the intermittent printing of 10 [mins] or more had no influence on increased occurrence of toner sticking.

Figure 8:
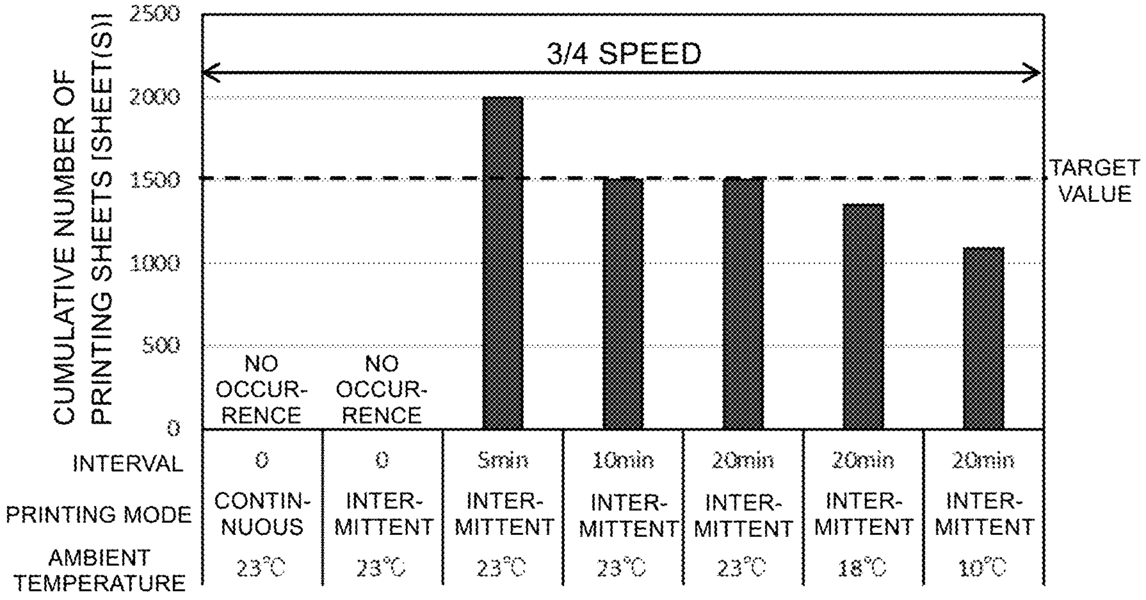
FIG. 8 is a graph showing results of the endurance printing test in a case where a system linear speed at the time of warming-up is reduced to ¾ (150 [mm/sec]) of the system linear speed at the time of image formation (the conventional example).

FIG. 8 is a graph showing results of the endurance printing test in a case where, when the system linear speed at the time of image formation is 200 [mm/sec], a system linear speed at the time of warming-up is reduced to ¾ (a first speed, 150 [mm/sec]) of the system linear speed at the time of image formation. As shown in FIG. 8, when the speed reduction control is performed to reduce the system linear speed at the time of warming-up to such a ¾ speed, the number of sheets printed up to when white streaks occur in the image is increased, and thus the life of the developing portion 33 can be prolonged. When, however, the ambient temperature was not more than 18° C. and the interval of the intermittent printing was not less than 20 [mins], the target value of 1,500 sheets failed to be met. Furthermore, also when the ambient temperature is 23° C., while the target value of 1,500 sheets is met, there is no tolerance (margin), and thus a target number of printed sheets might fail to be met due to variations in the test conditions and so on.

Figure 9:
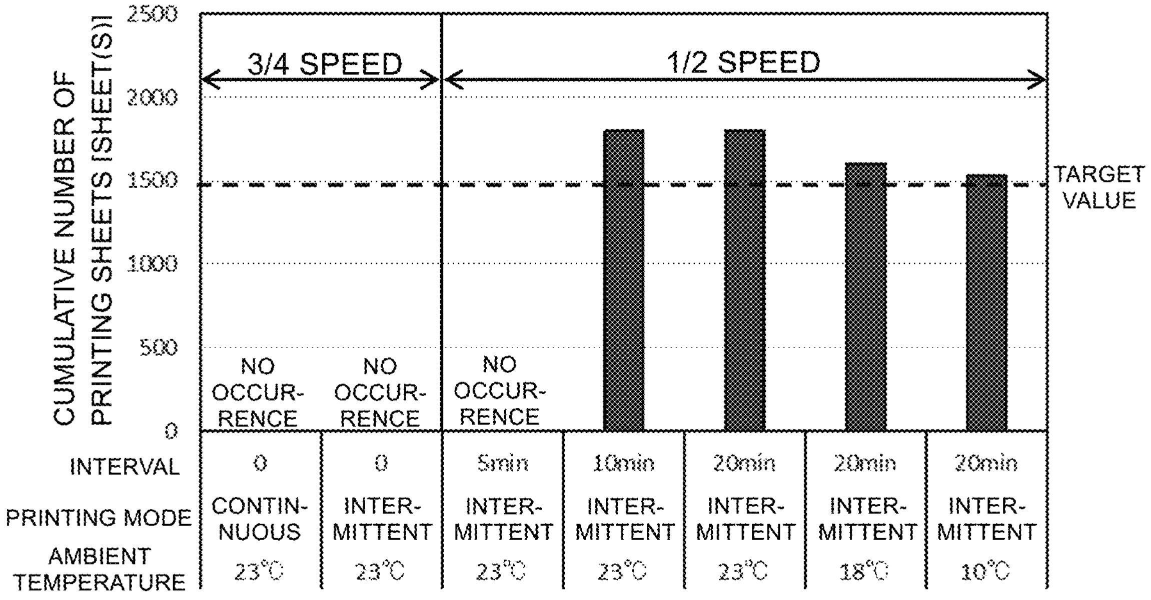
FIG. 9 is a graph showing results of the endurance printing test in a case where the system linear speed at the time of warming-up is made to vary in accordance with an interval of intermittent printing and an ambient temperature.

FIG. 9 is a graph showing results of the endurance printing test in a case where the system linear speed at the time of warming-up is made to vary in accordance with the interval of the intermittent printing and the ambient temperature. As shown in FIG. 9, when the interval of the intermittent printing was not less than 5 [mins] or the ambient temperature was not more than 18° C., the system linear speed at the time of warming-up was reduced further to ½ (a second speed, 100 [mm/sec]) of the system linear speed at the time of image formation, and thus also when the ambient temperature was not more than 18° C. and the interval of the intermittent printing was not less than 20 [mins], the target value of 1,500 sheets could be met, and even when the ambient temperature was 23° C. and the interval of the intermittent printing was not less than 10 [mins], the number of sheets printed up to when white streaks occurred in the image (tolerance) was increased.

Figure 10:
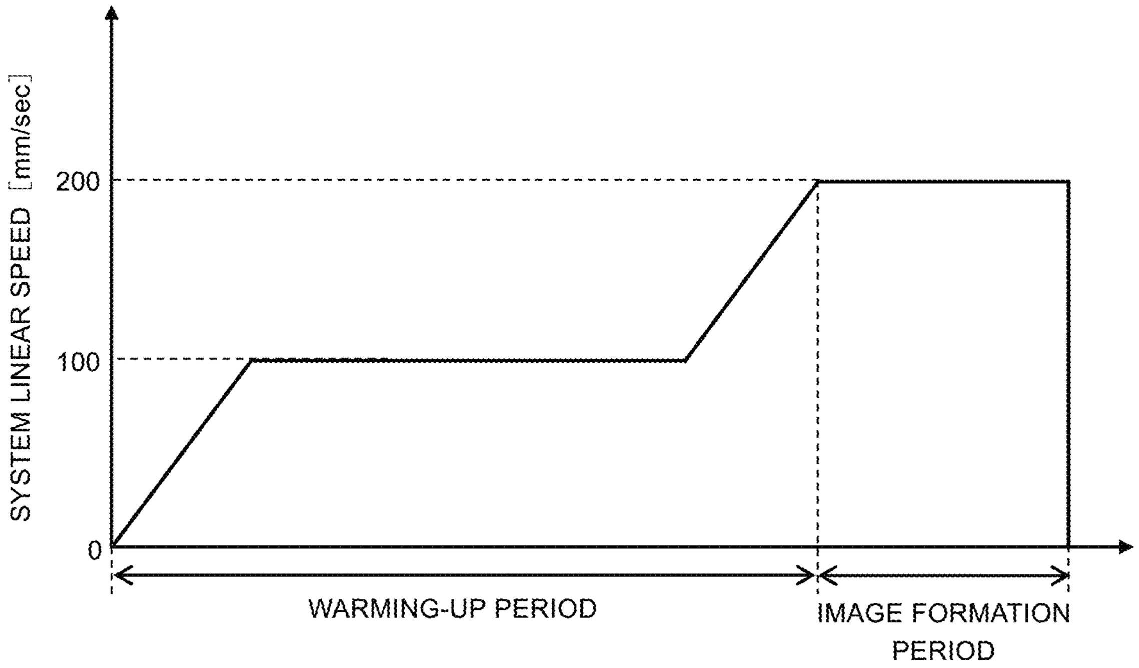
FIG. 10 is a graph showing a variation of the system linear speed when the system linear speed is made to vary from 0 [mm/sec] to ½ (100 [mm/sec]) of the system linear speed at the time of image formation and when the system linear speed is made to vary from such a ½ speed to the system linear speed (200 [mm/sec]) at the time of image formation.

Next, a description is given of another control example of the speed reduction control of the system linear speed executed in the image forming apparatus 1 of the present embodiment. FIG. 10 is a graph showing a variation of the system linear speed when the system linear speed is made to vary from 0 [mm/sec] to ½ (100 [mm/sec]) of the system linear speed at the time of image formation and when the system linear speed is made to vary from such a ½ speed to the system linear speed (200 [mm/sec]) at the time of image formation.

In FIG. 10, the system linear speed is made to vary at a prescribed acceleration rate (a slow-up operation) when the system linear speed is raised from 0 [mm/sec] to ½ (100 [mm/sec]) of the system linear speed at the time of image formation (at start-up of the image forming apparatus 1) and when the system linear speed is increased from the ½ speed (100 [mm/sec]) to the system linear speed (200 [mm/sec]) at the time of image formation.

Figure 11:
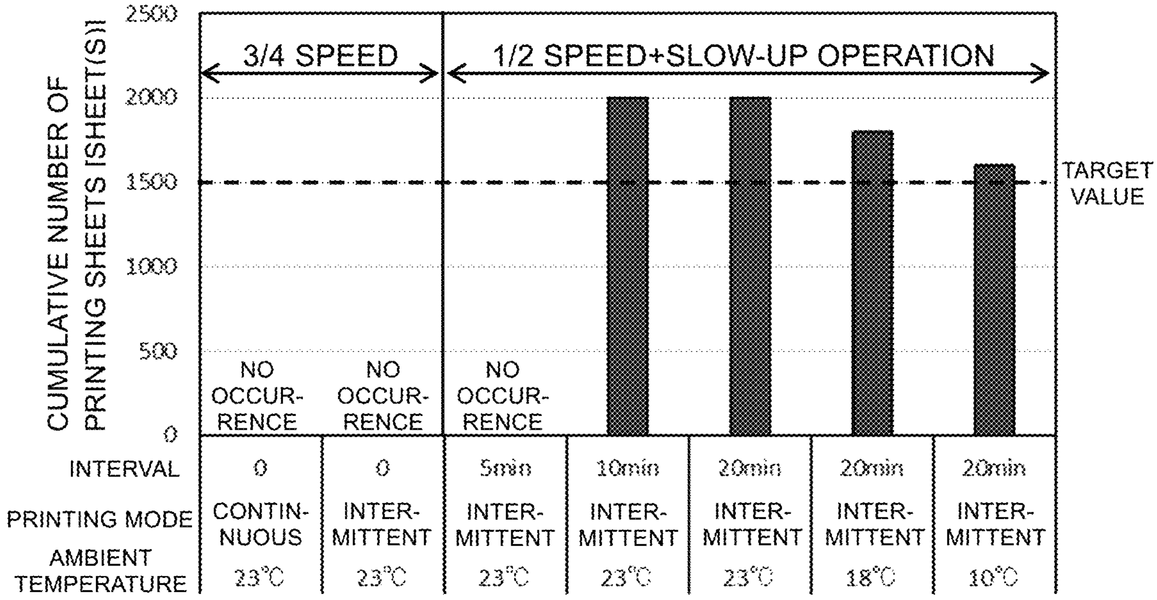
FIG. 11 is a graph showing results of the endurance printing test in a case where the speed reduction control of the system linear speed at the time of warming-up is performed so that the system linear speed varies as shown in FIG. 10.

FIG. 11 is a graph showing results of the endurance printing test in a case where the speed reduction control of the system linear speed at the time of warming-up is performed so that the system linear speed varies as shown in FIG. 10. In FIG. 11, the slow-up operation is not performed in a case where the system linear speed at the time of warming-up is set to a ¾ speed but performed in a case where the system linear speed is reduced to ½ (the second speed, 100 [mm/sec]) of the system linear speed at the time of image formation (the interval of the intermittent printing is not less than 10 [mins] or the ambient temperature is not more than 18° C.). In the endurance printing test, other conditions used are similar to those shown in FIG. 9.

As shown in FIG. 11, in a case where the slow-up operation was performed, even when the ambient temperature was not more than 10° C. and the interval of the intermittent printing was 20 minutes, the target value of 1,500 sheets could be met, and the number of sheets printed up to when white streaks occurred in the image (tolerance) was further increased compared with a case of not performing the slow-up operation (FIG. 9). This is conceivably because, during acceleration of the system linear speed, an excessive shearing force was prevented from acting on the toner interposed between the regulation blade 334 and the developing roller 331, and thus occurrence of white streaks in the image was suppressed.

Figure 12:
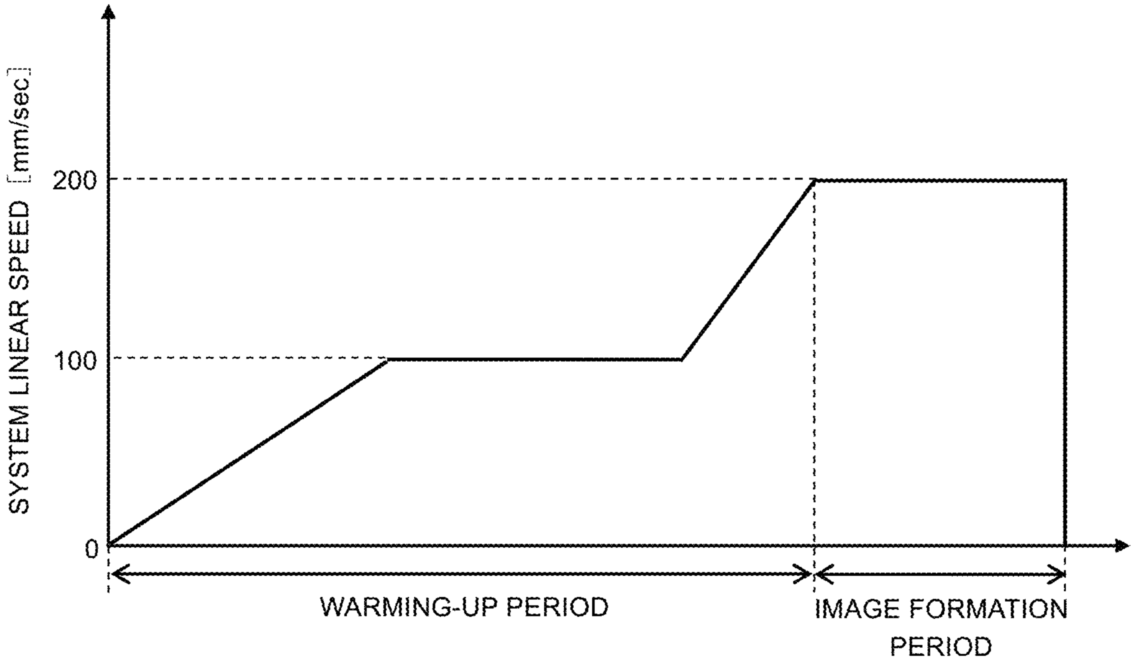
FIG. 12 is a graph showing a variation of the system linear speed in a case where an acceleration rate for making the system linear speed vary from 0 [mm/sec] to ½ (100 [mm/sec]) of the system linear speed at the time of image formation is set to be smaller than an acceleration rate for making the system linear speed vary from such a ½ speed to the system linear speed (200 [mm/sec]) at the time of image formation.

FIG. 12 is a graph showing a variation of the system linear speed in a case where an acceleration rate for making the system linear speed vary from 0 [mm/sec] to ½ (100 [mm/sec]) of the system linear speed at the time of image formation is set to be smaller than an acceleration rate for making the system linear speed vary from such a ½ speed to the system linear speed (200 [mm/sec]) at the time of image formation. In FIG. 12, an acceleration rate (a gradient of the graph) for raising the system linear speed from 0 [mm/sec] to ½ of the system linear speed at the time of image formation is set to ½ of an acceleration rate for increasing the system linear speed from the ½ speed to the system linear speed at the time of image formation (the reference speed).

Figure 13:
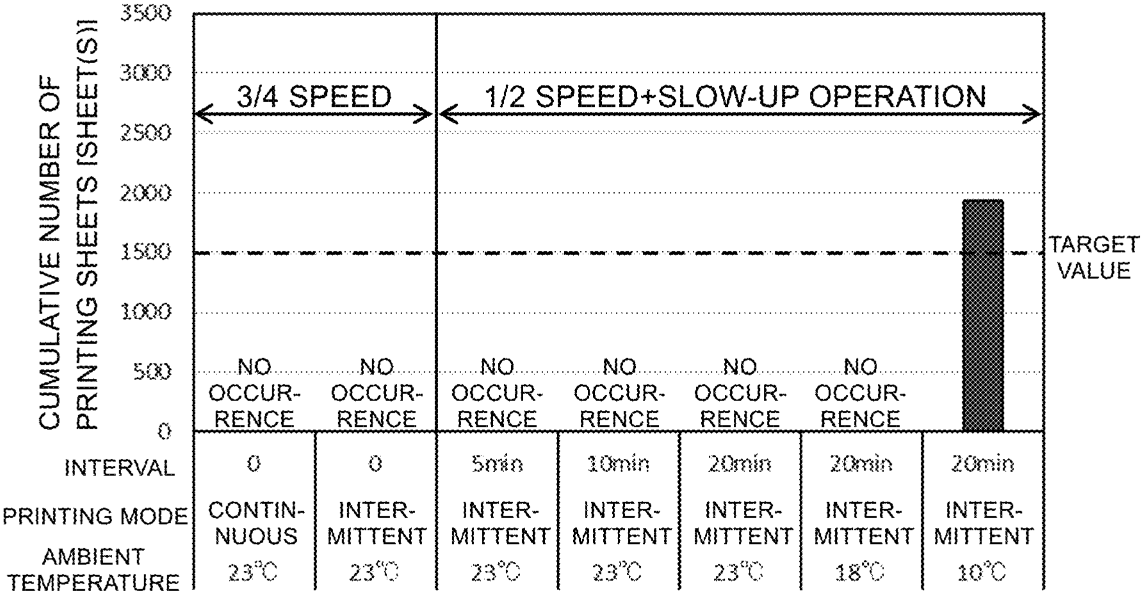
FIG. 13 is a graph showing results of the endurance printing test in a case where the speed reduction control of the system linear speed at the time of warming-up is performed so that the system linear speed varies as shown in FIG. 12.

FIG. 13 is a graph showing results of the endurance printing test in a case where the speed reduction control of the system linear speed at the time of warming-up is performed so that the system linear speed varies as shown in FIG. 12. In FIG. 13, the slow-up operation is performed in the case where the system linear speed is reduced to ½ (the second speed, 100 [mm/sec]) of the system linear speed at the time of image formation (the interval of the intermittent printing is not less than 10 [mins] or the ambient temperature is not more than 18° C.), and an acceleration rate for raising the system linear speed from 0 [mm/sec] to ½ of the system linear speed at the time of image formation is set to ½ of an acceleration rate for increasing the system linear speed from such a ½ speed to the system linear speed at the time of image formation (the reference speed). In the endurance printing test, other conditions used are similar to those shown in FIG. 11.

As shown in FIG. 13, in a case where the acceleration rate for raising the system linear speed from 0 [mm/sec] to ½ of the system linear speed at the time of image formation was set to be smaller than the acceleration rate for increasing the system linear speed from the ½ speed to the system linear speed at the time of image formation (the reference speed), even when the ambient temperature was not more than 10° C. and the interval of the intermittent printing was 20 minutes, the target value of 1,500 sheets could be readily met, and the number of sheets printed up to when white streaks occurred in the image (tolerance) was further increased compared with a case of not changing the acceleration rate for the slow-up operation (FIG. 11). This is conceivably because of the following reason. That is, when the developing roller 331 starts to rotate from a state where rotation thereof is stopped, static friction between the regulation blade 334 and the toner turns into kinetic friction, so that a strong shearing force is generated. By slowing down the rotation of the developing roller 331 at this time, an excessive shearing force was prevented from acting on the toner interposed between the regulation blade 334 and the developing roller 331, and thus occurrence of white streaks in the image was suppressed.

Figure 14:
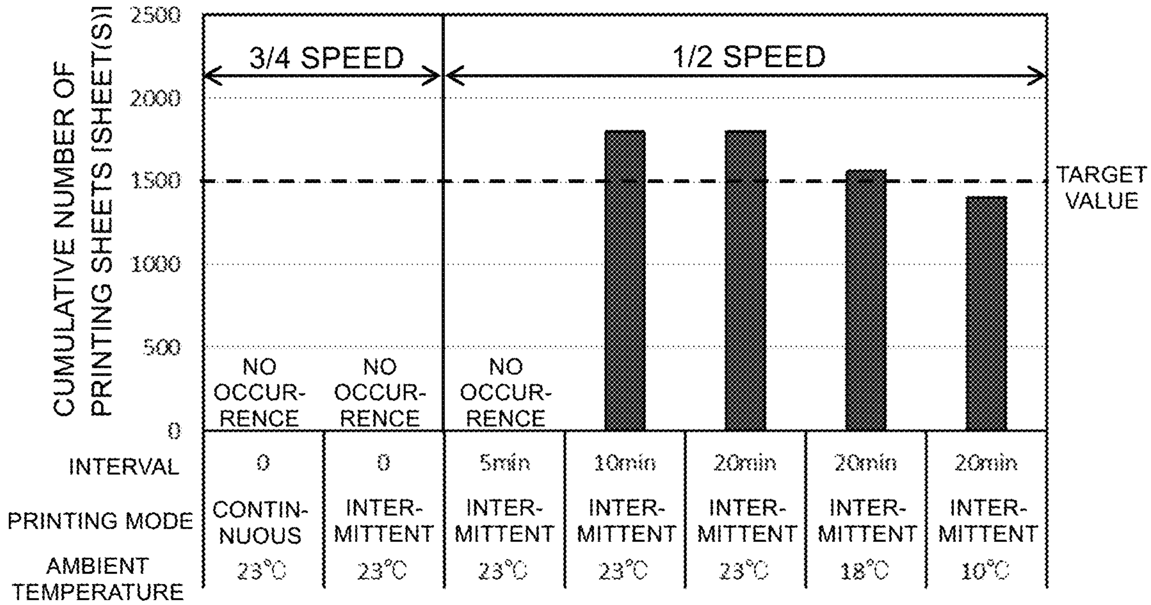
FIG. 14 is a graph showing results of the endurance printing test in a case where the speed reduction control of the system linear speed at the time of warming-up performed so that the system linear speed varies as shown in FIG. 12 is executed at or later than a stage corresponding to 25% of a life of the developing portion.

FIG. 14 is a graph showing results of the endurance printing test in a case where the speed reduction control of the system linear speed at the time of warming-up performed so that the system linear speed varies as shown in FIG. 12 is executed at or later than a stage corresponding to 25% of the life of the developing portion 33 (at a cumulative number of printed sheets of 375). As shown in FIG. 14, in the case where the speed reduction control is executed at or later than the stage corresponding to 25% of the life of the developing portion 33, the number of sheets printed up to when white streaks occur in the image is decreased as a whole, so that the target value of 1,500 sheets can no longer be met when the ambient temperature is not more than 10° C. and the interval of the intermittent printing is not less than 20 [mins]. Accordingly, it is preferable to execute the speed reduction control at or later than a stage corresponding to 20% of the life of the developing portion 33.

As is understood from the above-described results, while the higher the system linear speed, the more likely white streaks are to occur in an image, at the time of warming-up, the speed reduction control is performed to reduce the system linear speed to ¾ of the system linear speed at the time of image formation, and thus such occurrence of white streaks in an image can be suppressed. Meanwhile, while the more the system linear speed is reduced in the speed reduction control, the more the occurrence of white streaks in an image can be suppressed, the printing wait time is increased.

To avoid this, in the speed reduction control, the system linear speed is fundamentally reduced to ¾ (the first speed) of the system linear speed at the time of image formation, and when the interval of the intermittent printing is not less than 10 [mins] or the ambient temperature is not more than 18° C., the system linear speed is reduced to ½ (the second speed) of the system linear speed at the time of image formation. With this configuration, it is possible to effectively suppress the occurrence of white streaks in an image while minimizing an influence on the printing wait time during normal use.

Furthermore, in the case where the system linear speed is reduced to the ½ speed (the second speed), the system linear speed is made to vary at a prescribed acceleration rate when the system linear speed is raised from the stopped state to the ½ speed and when the system linear speed is increased from the ½ speed to the system linear speed at the time of image formation (the reference speed). Moreover, an acceleration rate for making the system linear speed vary from 0 [mm/sec] to the ½ speed is set to be smaller than an acceleration rate for increasing the system linear speed from the ½ speed to the system linear speed at the time of image formation (the reference speed).

With this configuration, when the developing roller 331 starts to rotate from the state where rotation thereof is stopped, it is possible to suppress an excessive shearing force acting on the toner interposed between the regulation blade 334 and the developing roller 331 and thus to more effectively suppress occurrence of white streaks in an image.

While in the examples shown in FIG. 10 and FIG. 12, respectively, the system linear speed is made to vary at a prescribed acceleration rate (the slow-up operation) both when the system linear speed is raised from the stopped state to the ½ speed and when the system linear speed is increased from the ½ speed to the system linear speed at the time of image formation (the reference speed), as described above, when the developing roller 331 starts to rotate, a maximum shearing force acts on the toner interposed between the regulation blade 334 and the developing roller 331. Because of this, the slow-up operation could be performed at least when the system linear speed is raised from the stopped state to the ½ speed.

Furthermore, in the results of the endurance printing test shown in FIG. 8 in which the system linear speed at the time of warming-up was reduced to ¾ of the system linear speed at the time of image formation, when the ambient temperature was not more than 18° C., the target value of 1,500 sheets could not be met, and also when the ambient temperature was 23° C., there was only limited tolerance (margin) from the target value of 1,500 sheets. Also in this case, by performing the slow-up operation when the system linear speed is raised from the stopped state to the ¾ speed as shown in FIG. 10 and FIG. 12, it is possible to suppress occurrence of white streaks in an image and thus to prolong the life of the developing portion 33. Moreover, by performing the slow-up operation also when the system linear speed is increased from the ¾ speed to the system linear speed at the time of image formation (the reference speed), it is possible to further prolong the life of the developing portion 33.

Furthermore, immediately after replacement of the developing portion 33 with a new one, since toner deterioration has not yet progressed, no white streaks occur in an image. Thus, when the speed reduction control is executed at or later than the stage corresponding to 20% of the life of the developing portion 33, image quality and image forming efficiency of the image forming apparatus 1 can be further improved.

The life of the developing portion 33 varies depending on an amount of the toner contained in the development housing 330, and the larger the amount of the toner contained in the development housing 330, the longer the life of the developing portion 33. Here, the larger the amount of the toner contained, the more unlikely toner deterioration is to progress. Since toner sticking to the regulation blade 334 is closely related to toner deterioration, the larger the amount of the toner contained, the more toner sticking is suppressed, and a cumulative number of sheets printed up to when white streaks start to occur in an image is also increased. Accordingly, when, regardless of a length of the life of the developing portion 33 (the amount of the toner contained), the speed reduction control is executed at or later than the stage corresponding to 20% of the life of the developing portion 33, it is possible to increase the number of sheets printed up to when white streaks occur in an image (tolerance). For example, in a case where a target value of the life of the developing portion 33 is 3,000 sheets, the speed reduction control of the system linear speed at the time of warming-up could be executed at or later than a time when the cumulative number of printed sheets is 600 sheets.

Figure 15:
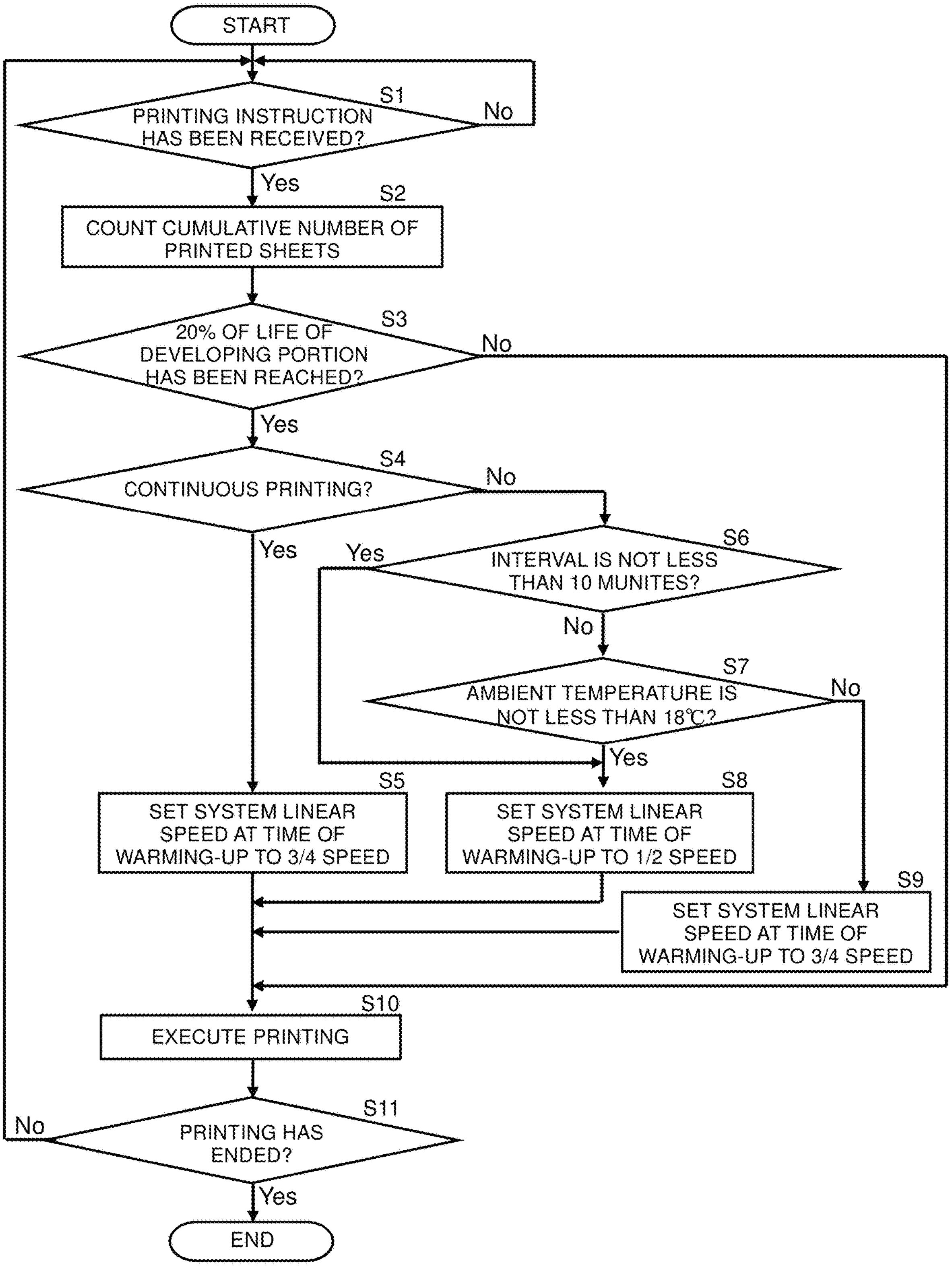
FIG. 15 is a flow chart showing an example of the speed reduction control of the system linear speed at the time of warming-up executed in the image forming apparatus of the present embodiment.

FIG. 15 is a flow chart showing an example of the speed reduction control of the system linear speed at the time of warming-up executed in the image forming apparatus 1 of the present embodiment. By referring to FIG. 1 to FIG. 14 as required and following steps shown in FIG. 11, a description is given of a procedure of the speed reduction control of the system linear speed at the time of warming-up.

First, the control section 90 determines whether or not a printing instruction has been received from a host apparatus such as a personal computer (step S1). In a case where the printing instruction has not been received (No at step S1), a printing standby state is continuously maintained as it is. In a case where the printing instruction has been received (Yes at step S1), the cumulative number of printed sheets is counted by the counter 95 (step S2).

Next, the control section 90 determines whether or not the cumulative number of printed sheets has reached 20% (300 sheets) of the life of the developing portion 33 (for example, 1,500 sheets) (step S3). In a case where the cumulative number has reached 20% of the life of the developing portion 33 (Yes at step S3), it is determined next whether or not the printing instruction is to perform continuous printing (step S4). In a case where the printing instruction is to perform continuous printing (Yes at step S4), the linear speed at the time of warming-up is set to ¾ (150 [mm/sec]) of the system linear speed at the time of image formation (for example, 200 [mm/sec]) (step S5).

On the other hand, in a case where the printing instruction is to perform intermittent printing (No at step S4), it is determined whether or not an interval from immediately previously performed printing is not less than 10 minutes (step S6). In a case where the interval is less than 10 minutes (No at step S6), it is further determined whether or not the ambient temperature measured by the in-apparatus temperature and humidity sensor 61 is not more than 18° C. (step S7). Further, in a case where the interval from immediately previously performed printing is not less than 10 minutes (Yes at step S6) or in a case where the ambient temperature is not more than 18° C. (Yes at step S7), the system linear speed at the time of warming-up is set to ½ (100 [mm/sec]) of the system linear speed at the time of image formation (step S8). At this time, as shown in FIG. 10 or FIG. 12, the system linear speed is made to vary at a prescribed acceleration rate when the system linear speed is raised from 0 [mm/sec] to ½ of the system linear speed at the time of image formation and when the system linear speed is increased from such a ½ speed to the system linear speed at the time of image formation.

In a case where the interval form immediately previously performed printing is less than 10 minutes and the ambient temperature is not less than 18° C. (No at step S7), similarly to the case of continuous printing, the system linear speed at the time of warming-up is set to ¾ (150 [mm/sec]) of the system linear speed at the time of image formation (step S9). In a case where the cumulative number of printed sheets has not reached 20% of the life of the developing portion 33 (No at step S3), the system linear speed at the time of warming-up is set to the system linear speed at the time of image formation (the speed reduction control is not executed).

Further, after warming-up is executed at the system linear speed thus set, printing is executed (step S10). After that, it is determined whether or not the printing has ended (step S11), and in a case where the printing has been continuously performed (No at step S11), a return is made to step S1 so that a similar procedure is repeatedly performed (steps S1 to S11). In a case where the printing has ended (Yes at step S11), processing is ended.

According to the control example shown in FIG. 15, in a case where continuous printing is performed or an interval of intermittent printing is less than 10 minutes, and the ambient temperature is not less than 18° C., warming-up is executed at ¾ of the system linear speed at the time of image formation, while in a case where the interval of intermittent printing is not less than 10 [mins] or the ambient temperature is not more than 18° C., the warming-up is executed at ½ of the system linear speed at the time of image formation. With this configuration, the system linear speed at the time of warming-up performed under printing conditions under which white streaks are likely to occur in an image is further reduced, and thus it is possible to suppress occurrence of white streaks in an image while maximally reducing a warming-up time.

Furthermore, in the case where the system linear speed is reduced to the ½ speed, the system linear speed is made to vary at a prescribed acceleration rate when the system linear speed is raised from the stopped state to the ½ speed and when the system linear speed is increased from the ½ speed to the system linear speed at the time of image formation. With this configuration, it is possible to suppress an excessive shearing force acting on the toner interposed between the regulation blade 334 and the developing roller 331 and thus to more effectively suppress occurrence of white streaks in an image.

Furthermore, the speed reduction control is not executed at the start of use of the developing portion 33 at which white streaks are unlikely to occur in an image and is executed at a point in time when the cumulative number of printed sheets reaches 20% of the life of the developing portion 33, and thus it is possible to omit performing unnecessary speed reduction control at an initial stage of use of the developing portion 33 and thus to improve the image forming efficiency.

While herein, the life of the developing portion 33 is estimated based on the cumulative number of sheets printed from the start of use of the developing portion 33, the life of the developing portion 33 can also be estimated based on a cumulative drive time of the developing portion 33 (or a main motor 50) from the start of use of the developing portion 33.

Furthermore, while in the present embodiment, the main motor 50 drives all the members to be driven inside the image forming apparatus 1 including the photosensitive drum 31, the developing roller 331, and the fixing roller 41, in a case of a configuration in which a development drive motor that drives the developing portion 33 is provided separately from the main motor 50, at the time of warming-up, instead of the main motor 50 being controlled to reduce the system linear speed, the development drive motor could be controlled to reduce only the rotation speed of the developing roller 331.

(5. Other Configurations)

Figure 16:
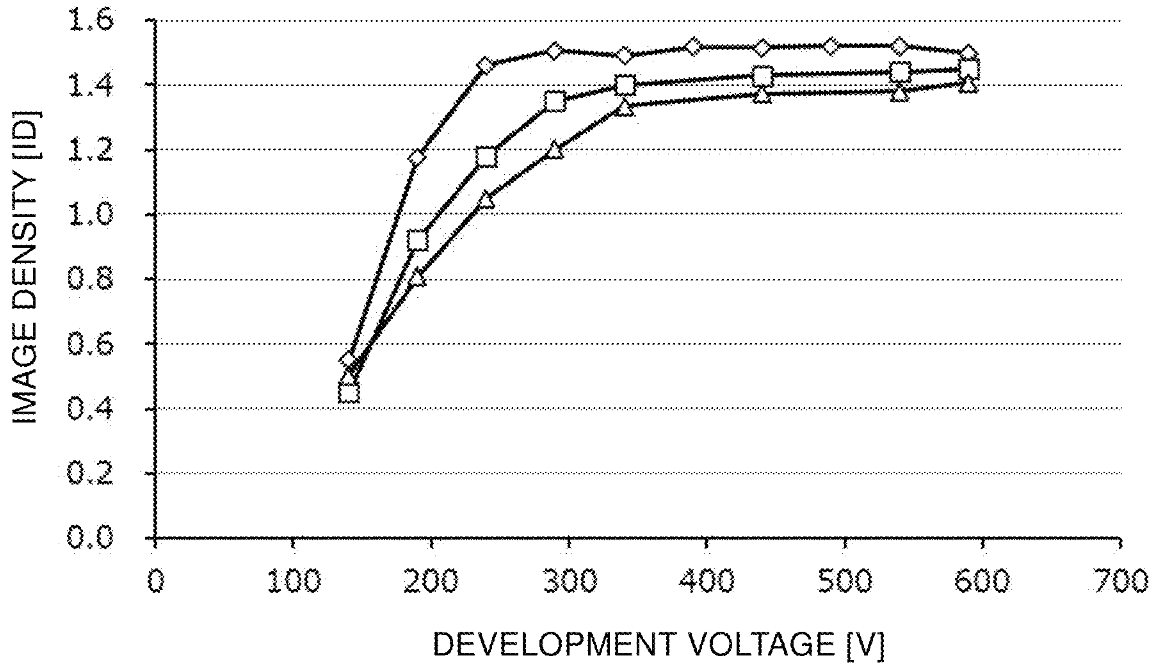
FIG. 16 is a graph showing a relationship between a development voltage applied to the developing roller and an image density (ID) in a case where a surface free energy of the developing roller is made to vary.

FIG. 16 is a graph showing a relationship between a development voltage applied to the developing roller 331 and an image density (ID) in a case where a surface free energy of the developing roller 331 is made to vary. The surface free energy corresponds to a surface tension of a liquid in a solid and refers to a molecular energy of a surface itself of the solid. In FIG. 16, a data series denoted with rhombuses indicates a case where the developing roller 331 has a surface free energy of 12 mJ/m$^2$, a data series denoted with squares indicates a case where the developing roller 331 has a surface free energy of 21 mJ/m$^2$, and a data series denoted with triangles indicates a case where the developing roller 331 has a surface free energy of 30 mJ/m$^2$.

As shown in FIG. 16, the higher the surface free energy of the developing roller 331, the more a development voltage usable range OW tends to be narrowed. This is because an upper limit value of such a pressing force of the developing roller 331 that white voids occur in a half-tone image decreases with increasing surface free energy of the developing roller 331. Preferably, the developing roller 331 has a surface free energy of not less than 5 mJ/m$^2$ and not more than 27 mJ/m$^2$.

Furthermore, an amount of the toner regulated by the regulation blade 334 varies also depending on a contact area ratio of the outer circumferential surface of the developing roller 331. The contact area ratio of the outer circumferential surface of the developing roller 331 refers to a ratio of an area of a region on the outer circumferential surface of the developing roller 331 excluding a concave (a non-contact part) to an area of the outer circumferential surface thereof. That is, the contact area ratio of the circumferential surface of the developing roller 331 represents a true contact area between the outer circumferential surface of the developing roller 331 and the regulation blade 334 with respect to an apparent contact area therebetween. The contact area ratio is preferably 4.5% to 10% and more preferably 6% to 8%.

A regulation pressure of the regulation blade 334 is preferably 10 N/m to 60 N/m and more preferably 15 N/m to 25 N/m. There is no particular limitation on a method for manufacturing the developing roller 331, and a surface roughness of the developing roller 331 may be adjusted by coating the developing roller 331 with a coat layer containing particles or may be adjusted merely by polishing.

Furthermore, in the present embodiment, both of a toner (a pulverized toner) manufactured by a pulverization method and a toner (a polymerized toner) manufactured by a polymerization method can be used. Due to its truly spherical shape having a high circularity, the polymerized toner is low in adhesion force to provide good development performance and thus has a broader usable range OW. The present disclosure is, therefore, particularly useful in the non-magnetic one-component development type that uses the pulverized toner less costly than the polymerized toner.

Furthermore, in the present embodiment, it is confirmed that the use of a toner having a central particle diameter of 6.0 μm to 8.0 μm provides excellent results. The reason for selecting a central particle diameter in this range is as follows. That is, a central particle diameter outside this range is not preferable in that a central particle diameter smaller than 6.0 μm leads to an increase in manufacturing cost of the toner, and a central particle diameter larger than 8.0 μm leads to an increase in consumption amount of the toner and thus to deterioration in fixability.

Furthermore, in the present embodiment, it is confirmed that the use of a toner having a circularity of 0.93 to 0.97 provides excellent results. A circularity outside this range is not preferable for the following reasons. That is, a circularity of not more than 0.93 tends to decrease image quality. A circularity of not less than 0.97 leads to a substantial increase in manufacturing cost.

Furthermore, in the present embodiment, it is confirmed that the use of a toner having a melt viscosity of not more than 100,000 Pas at 90° C. provides excellent results. A melt viscosity exceeding 100,000 Pas at 90° C. leads to deterioration in fixability of the toner and thus is not preferable from the standpoint of energy saving.

Furthermore, it is confirmed that a linear speed difference between the photosensitive drum 31 and the developing roller 331 in a range of 1.1 times to 1.6 times (a surface speed of the developing roller 331 is higher than that of the photosensitive drum 31) provides similar results. A linear speed difference smaller than 1.1 times leads to occurrence of fogging in which a toner adheres to a blank part of a sheet and thus is not preferable. On the other hand, a linear speed difference of not less than 1.6 times leads to an increase in driving torque or vibrations of the developing portion 33 or an increase in mechanical stress on the toner and thus is not preferable from the standpoint of a life of the apparatus.

Furthermore, it is confirmed that a surface potential VO in a range of 500 V to 800 V and a post-exposure potential VL in a range of 70 V to 200 V of the photosensitive drum 31 provide similar effects.

Other than the above, the present disclosure is not limited to the foregoing embodiment and can be variously modified without departing from the spirit of the present disclosure. For example, while the foregoing embodiment has described a monochrome printer as an example of the image forming apparatus 1, the present disclosure is applicable also to, for example, a color printer of a tandem type or a rotary type. Furthermore, the present disclosure is applicable also to an image forming apparatus such as a copy machine, a facsimile, or a multi-functional peripheral equipped with functions thereof. It is required, however, to include the photosensitive drum 31 and the developing portion 33 of the non-magnetic one-component development type.

Furthermore, while the photosensitive drum 31 in the foregoing embodiment uses a cylindrical raw tube as a support, a support having any other shape may also be used. Examples of the other shape may include a plate shape and an endless belt shape. Furthermore, while the photosensitive drum 31 in the foregoing embodiment uses an organic photoconductive layer (OPC), there may be provided, for example, an electric charge injection blocking layer that blocks injection of electric charges from the support.

The present disclosure is usable in an image forming apparatus including a developing device of the non-magnetic one-component development type using a non-magnetic toner. Through the use of the present disclosure, it is possible to provide an image forming apparatus capable of effectively suppressing toner sticking to a regulation blade and resulting occurrence of white streaks in an image in the non-magnetic one-component development type.

What is claimed is:

1. An image forming apparatus, comprising:
- an image carrying member including a photosensitive layer formed on a surface thereof;
- a charging device that charges the image carrying member to a prescribed surface potential;
- an exposure device that exposes to light the surface of the image carrying member charged by the charging device so as to form thereon an electrostatic latent image with attenuated electrostatic charge;
- a developing device including:
  - a development container for containing a non-magnetic one-component developer composed only of a toner;
  - a developer carrying member that is brought into pressure contact at a prescribed pressing force with the image carrying member and has an outer circumferential surface on which the toner is carried to form a toner layer; and a regulation blade that contacts the outer circumferential surface of the developer carrying member so as to regulate a thickness of the toner layer formed on the outer circumferential surface of the developer carrying member, the developing device supplying the toner to the image carrying member on which the electrostatic latent image is formed; and a control section that controls driving of the developing device, wherein the control section executes speed reduction control to reduce a rotation speed of the developer carrying member at a time of warming-up before image formation to a first speed lower than a reference speed at a time of the image formation, and in the speed reduction control, the control section raises the rotation speed of the developer carrying member at a first acceleration rate until the first speed is reached from a state where rotation of the developer carrying member is stopped.

2. The image forming apparatus according to claim 1, wherein in the speed reduction control, the control section raises the rotation speed of the developer carrying member at a second acceleration rate until the reference speed is reached from the first speed.

3. The image forming apparatus according to claim 2, wherein the first acceleration rate is smaller than the second acceleration rate.

4. An image forming apparatus, comprising:

an image carrying member including a photosensitive layer formed on a surface thereof;

a charging device that charges the image carrying member to a prescribed surface potential;

an exposure device that exposes to light the surface of the image carrying member charged by the charging device so as to form thereon an electrostatic latent image with attenuated electrostatic charge;

a developing device including:

a development container for containing a non-magnetic one-component developer composed only of a toner;

a developer carrying member that is brought into pressure contact at a prescribed pressing force with the image carrying member and has an outer circumferential surface on which the toner is carried to form a toner layer; and a regulation blade that contacts the outer circumferential surface of the developer carrying member so as to regulate a thickness of the toner layer formed on the outer circumferential surface of the developer carrying member, the developing device supplying the toner to the image carrying member on which the electrostatic latent image is formed;

a control section that controls driving of the developing device; and a temperature detecting device that detects a temperature in a vicinity of the developing device, wherein the control section executes speed reduction control to reduce a rotation speed of the developer carrying member at a time of warming-up before image formation to a first speed lower than a reference speed at a time of the image formation, when a printing operation to be performed after the warming-up is intermittent printing and an interval of the intermittent printing is not less than a prescribed amount of time or the temperature detected by the temperature detecting device is not more than a prescribed temperature, the control section reduces the rotation speed of the developer carrying member in the speed reduction control to a second speed lower than the first speed, and only in a case where the rotation speed of the developer carrying member is set to the second speed, the control section raises the rotation speed of the developer carrying member at a first acceleration rate until the second speed is reached from a state where rotation of the developer carrying member is stopped.

5. The image forming apparatus according to claim 4, wherein the control section raises the rotation speed of the developer carrying member at a second acceleration rate until the reference speed is reached from the second speed.

6. The image forming apparatus according to claim 5, wherein the first acceleration rate is smaller than the second acceleration rate.

7. The image forming apparatus according to claim 6, wherein the first speed is ¾ of the reference speed, and the second speed is ½ of the reference speed.

8. The image forming apparatus according to claim 7, wherein when the interval of the intermittent printing is not less than 10 minutes or when the temperature detected by the temperature detecting device is not more than 18° C., the control section reduces the rotation speed of the developer carrying member in the speed reduction control to the second speed.

9. The image forming apparatus according to claim 8, wherein the control section executes the speed reduction control after a cumulative drive time of the developing device from a start of use of the developing device has reached 20% of a life of the developing device.

10. The image forming apparatus according to claim 9, further comprising:

a printed sheet number counting portion that counts a cumulative number of sheets printed from the start of use of the developing device, wherein based on the cumulative number of sheets printed, the control section estimates the cumulative drive time.

* * * * *